US006917923B1

(12) United States Patent
Dimenstein (10) Patent No.: US 6,917,923 B1
(45) Date of Patent: Jul. 12, 2005

(54) APPROVED WEB SITE FILE DOWNLOADING

(75) Inventor: Zachary David Dimenstein, Bronx, NY (US)

(73) Assignee: Samsung Electronics Co., Ltd., Suwon-si (KR)

(*) Notice: Subject to any disclaimer, the term of this patent is extended or adjusted under 35 U.S.C. 154(b) by 674 days.

(21) Appl. No.: 09/495,116

(22) Filed: Feb. 1, 2000

Related U.S. Application Data (60) Provisional application No. 60/118,133, filed on Feb. 1, 1999.

(51) Int. Cl.[7] .............................................. G06F 17/60
(52) U.S. Cl. .............................. 705/51; 705/57; 380/44
(58) Field of Search ............................. 705/51, 57, 59; 380/201, 44

(56) References Cited

U.S. PATENT DOCUMENTS 5,774,869 A * 6/1998 Toader ........................ 705/10
6,144,743 A * 11/2000 Yamada et al. ................ 380/44
6,195,432 B1 * 2/2001 Takahashi et al. ............. 380/9
6,425,010 B1 * 7/2002 Alles et al. .................. 709/225
6,434,535 B1 * 8/2002 Kupka et al. ................. 705/24

FOREIGN PATENT DOCUMENTS

EP          0717 338 A1 *   6/1996

OTHER PUBLICATIONS

The Philadelphia Inquirer New Technology Products Column, KRTBN Knight–Ridder Tribune Business News (Philadelphia Inquirer Pennsylvania), Nov. 2, 2000.*

* cited by examiner

Primary Examiner—Mary Cheung
(74) Attorney, Agent, or Firm—Robert E. Bushnell, Esq.

(57) ABSTRACT

Disclosed are processes and apparatus that, when practiced according to the principles of the present invention, ensure that a digital storage device will only be able to download or play files that were obtained from sources deemed, either by the manufacturer of the device or by an overseeing organization, to be acceptable.

50 Claims, 5 Drawing Sheets

APPROVED WEB SITE FILE DOWNLOADING

CLAIM OF PRIORITY

This application makes reference to, incorporates the same herein, and claims all benefits accruing under 35 U.S.C. §§119 from a provisional application for Approved Web Site File Downloading earlier filed under 35 U.S.C. §111(b) in the United States Patent & Trademark Office on the 1st of Feb. 1999 and there duly assigned Ser. No. 60/118,133.

FIELD OF THE INVENTION

The present invention generally relates to a process and apparatus for ensuring that a digital storage device will only be able to download or play files that were obtained from sources deemed by the manufacturer of the device, or by an overseeing organization, to be acceptable, and, more particularly, to processes and devices able to ensure that the digital storage device does not download, play or display files that were obtained over the Internet from web sites that have not been pre-approved by either the manufacturer of the device or by an overseeing organization.

BACKGROUND OF THE INVENTION

With the growing popularity of using the Internet to transfer files in digital format, there has been increasing concern over the need to protect the intellectual property rights of individuals and organizations to copyrighted materials such as books, music, movies and manuscripts. Once copyrighted materials have been made available in digital format, high quality illegal copies of copyrighted materials can be quickly and indiscriminately be made available to others.

Several web sites currently make available, for free distribution, unencrypted files of the contents of copyrightable material, such as books and audio music. Several of these web sites are maintained with the full consent of the lawful owners of the copyrighted material because some copyright owners see this as a way to help promote and market their products. On the other hand, there are other web sites that make available copyrighted files without the consent of the rightful owners of the copyright. Generally, it is desirable to allow web sites to distribute lawfully available copies of both unencrypted and encrypted files over the Internet to digital devices while concurrently preventing these digital devices from being able to either play or download illegally available files. One technique that is currently used to address this problem uses encryption to allow only devices with the appropriate encryption key to decrypt a particular file; therefore, when an encrypted file is downloaded from a web site, only the devices for which the file was intended are able to decrypt that file.

Existing encryption techniques are appropriate in the situation where only legal sources have access to specific copyrighted material and precaution has been made to assure that whoever downloads that material cannot subsequently distribute the material in an unencrypted format for use, by way of example, on another device able to display, reproduce or play the copyrighted material. I have noticed however, that existing encryption methods do not solve the problem of protecting copyrighted material from unlawful use or reproduction if the copyrighted material is already available in the hands of those who would make it available illegally; such is the case with music files, which are already widely distributed in digital format (i.e., compact discs, commonly known as "CD's") making it easy for someone to illegally distribute the musical content read from the disc over the Internet.

The fact that the digital content of a file, such as music, happens to be encrypted does not mean that the digital content has been made available with the consent of the rightful owners in the first place; therefore, encryption alone is not sufficient to address this problem of protecting copyrightable material.

One solution recently proposed to address this problem suggests that each file be encoded with a digital signature whereby PC's and other devices can recognize that only files with that type of digital signature are legal. I have noticed that one problem with this approach is that, although an attempt may be made to limit the distribution of the digital signature algorithm generator, it may be difficult to keep the generator from reaching the hands of those who would put digital signatures on files which are distributed without the authorization of the rightful owners of those files; once the digital signature generator is in unauthorized hands, reliance upon the generator becomes useless as a method for differentiating between legally and illegally copied files.

SUMMARY OF THE INVENTION

It is, therefore, one object of the present invention to provide improved processes and apparatus for distribution of files via the Internet.

It is another object to provide processes and apparatus to allow web sites to distribute lawfully available copies of both unencrypted and encrypted files over the Internet to digital devices, while concurrently preventing these digital devices from being able to either play or download files that are available illegally.

It is still another object to provide processes and apparatus that allow web sites to distribute legally available unencrypted and encrypted files over the Internet while simultaneously preventing digital devices from either playing or downloading illegally available files.

It is yet another object to provide a relatively efficient and foolproof solution that, when incorporated into processes and apparatus during the practice of the principles of the present invention, remedies the problem of protecting copyrightable material from unlawful use, reproduction and distribution by ensuring that a digital storage device will only be able to download or play those files that were obtained from approved sources.

Due to the open architecture of personal computers and the fact that personal computers are currently not covered under the Digital Audio Recording Devices And Media Act, 17 U.S.C. §1001, et seq., it may be difficult to restrict a personal computer from downloading illegally available material; however, it is still possible from both a technical and legal perspective to restrict non-personal computer digital devices (i.e., non-PC's) from downloading illegal material either directly from the Internet or from a personal computer. These and other objects may be attained by setting up of an approved web site database with a personal computer that is equipped with software that encrypts only those files that are downloaded from web sites listed on that database. In turn, a digital storage device with a personal computer interface only downloads those files that have been appropriately encoded by the personal computer; alternatively, the digital storage device can be allowed to download any file but not be allowed to play or display any downloaded file. Similarly, non-PC digital devices with direct Internet connectivity would be able to only download, play and display those files downloaded from web sites on the Approved Web Site Database. The present invention may, therefore, be practiced regardless of whether the files that are made available on a web site are either in an encrypted or in an unencrypted format.

In the practice of this invention with unencrypted files, digital devices are only able to download files that were made available in unencrypted format with the permission of the rightful owners of the copyrighted content of the material. The only action that is required by the managers of web sites will be to submit their web site to an industry committee as a legitimate source of files containing copyrighted material. This web site is in turn placed on the Approved Web Site Database and can be monitored for compliance with copyright protection laws. Those web sites that make available files without the consent of the rightful owners of the copyrighted material in those files would be denied listing on the Approved Web Site Database by the industry committee.

When used with unencrypted files, this invention ensures that digital devices are only able to download files that were made available in unencrypted format with the permission of the rightful owners of the copyrighted content. The maintainers of web sites submit their web site to an industry committee as a legitimate source of files. This web site is in turn placed on an Approved Web Site Database and can be monitored for compliance with copyright protection laws. Those web sites that make available files without the consent of the rightful owners of these files would not be placed on the Approved Web Site Database by the industry committee.

When integrated with an encrypted file secure downloading solution, the practice of this invention ensures that web sites are making encrypted content available with the consent of the content's rightful owners of the copyright in that material. The fact that a web site happens to have the software necessary to encrypt the content still does not necessarily mean that the website is lawfully making those files available over the Internet in the first place. Proper maintenance of the Approved Web Site Database can serve as a way to ensure that Digital Storage Devices are only able to download encrypted files that were made available with the consent of the rightful owners of the copyright to the content.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
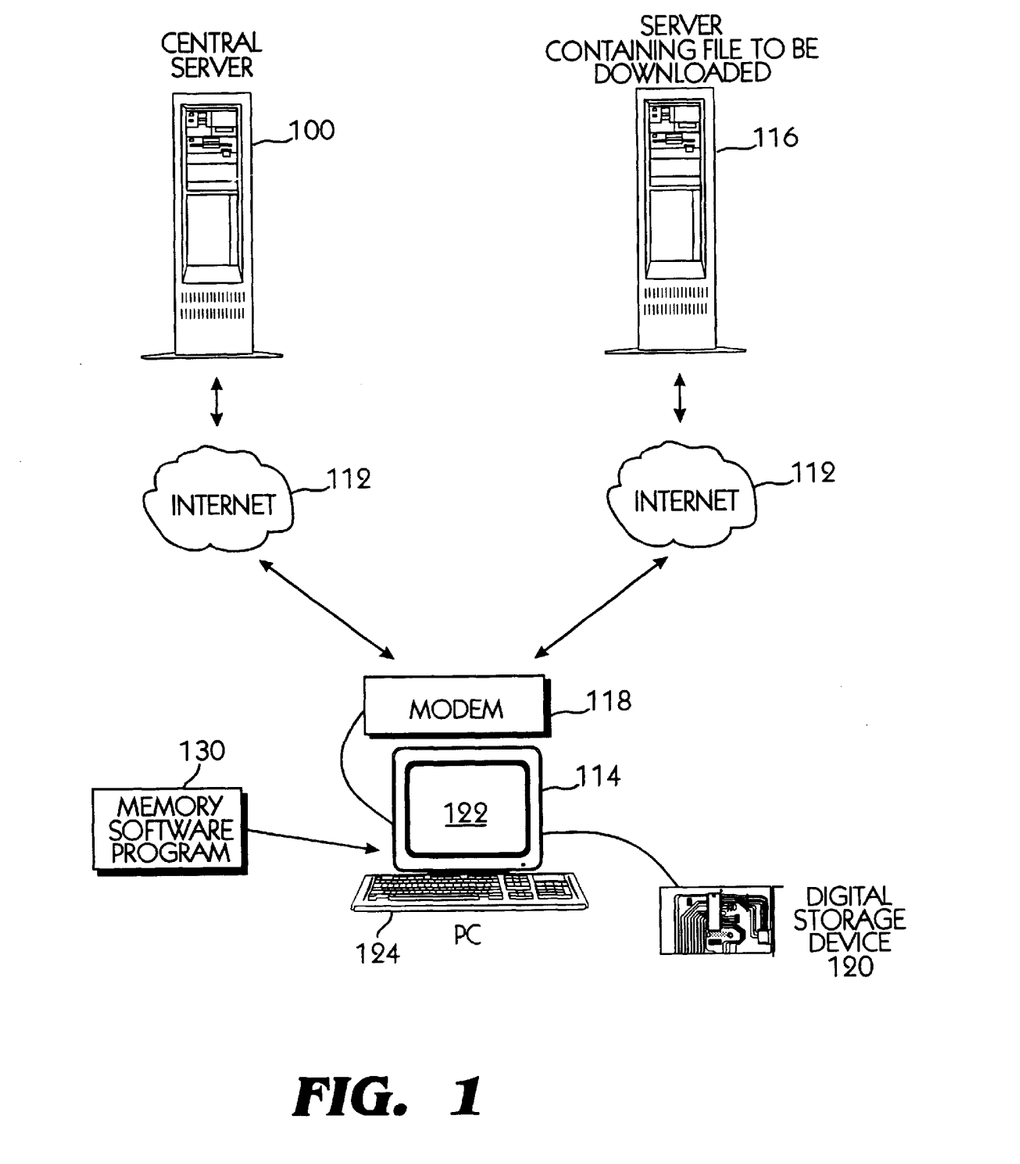
FIG. 1 is a diagram that illustrates the components of one system that may be used in the practice of the principles of the present invention.

Turning now to the drawings, FIG. 1 illustrates one system constructed as an Approved Web Site MP3 for downloading protectable material during the practice of the principles of the present invention. A central server 100, operationally coupled to transmit and receive communications on the Internet 1112, contains an Approved Web Site Database, which is a list of web sites maintained by a personal computer 114 that is deemed to be one of a plurality of acceptable sources that are authorized to download, via the modem 118 of computer 114, a file of a certain type from a server 116 to non-PC digital devices, such as digital storage device 120. Digital storage device 120 would, in turn, enable a consumer to use the downloaded material in, by way of example, listening to audio sounds and music and viewing video images that are contained within the downloaded file, with speakers or earphones (not shown) and the video monitor 122 of personal computer 114. Keyboard 124 enables the consumer to control personal computer 114 as well as to access the Internet 112 via modem 118.

Digital storage device 120 contains a PC interface (not separately shown) that permits control and data communication between computer 114 and device 120. Computer 114 loads from either an internal memory such as its hard disk, or from an external source, software that is adherent to the specifications described in the following paragraphs, to maintain copyright protection during and after the transfer of digital material to non-PC Internet enabled digital storage devices 120, as well as to digital storage devices that are able to download copyrightable material from the Internet 112 without the assistance of a PC 114.

Figure 2:
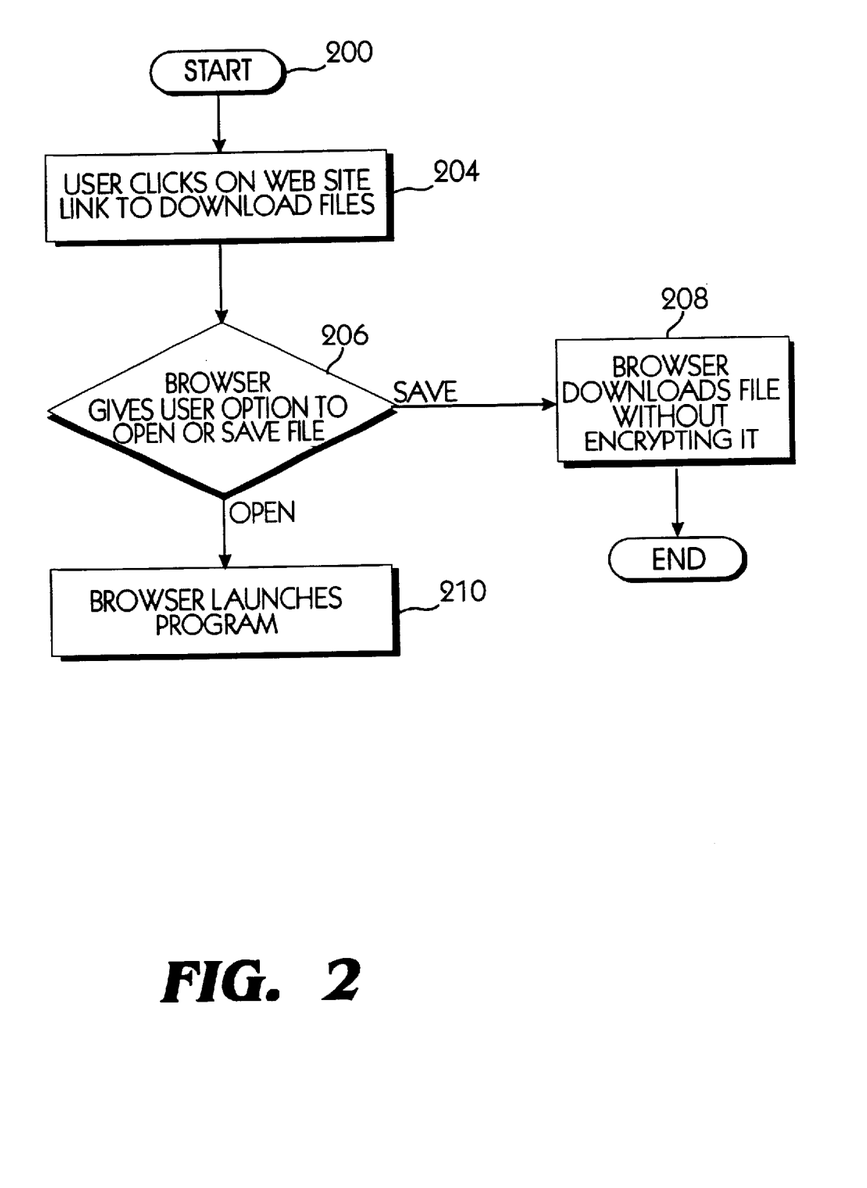
FIG. 2 is a flow chart diagram that illustrates several of the steps that may be followed in order to launch a software program on a personal computer by using a standard web browser.

Turning now to FIG. 2, before a user begins to download selected files from Internet 112 onto a digital storage device 120 with a PC interface via a personal computer 114, the user first needs to load a software program (hereinafter sometimes referred to as the "Software Program" that is adherent to the specifications of this invention) from a memory 130 onto the operating system of computer 114. The Software Program loaded from memory 130 can contain its own web browser program or the Software Program can be used in conjunction with another web browser already stored in computer 114. If the Software Program is to be used with another web browser, the Software Program can be stored in a plug-in module that works with the web browser or the Software Program can configure the web browser so that the Software Program is the default executable program that is run whenever a user opens a file of the type that this system will be protecting (e.g., MP3).

As illustrated by FIG. 2, to implement the latter approach, after starting the Software Program in step 200, in step 204 the user clicks a mouse selector button (not shown) or a keyboard designator to select a website link, and to select and to download specific files desired by the user. The Software Program gives the user an option in step 206 to either save or to open the selected downloaded file. Designation by the user of an election to save the selected file triggers the Software Program to download the selected file from server 116 without first encrypting the selected file (step 208). Alternatively, designation by the user of an election to open the selected file triggers the Software Program to open the downloaded file and, in step 210, launch a program for playing the contents of the opened file. As illustrated in FIG. 2, the Software Program may be implemented with either a plug-in or proprietary web browser in much the same way. Accordingly, the Figures use a web browser as an illustrative example of an implementation of the principles of the present invention.

Figure 3:
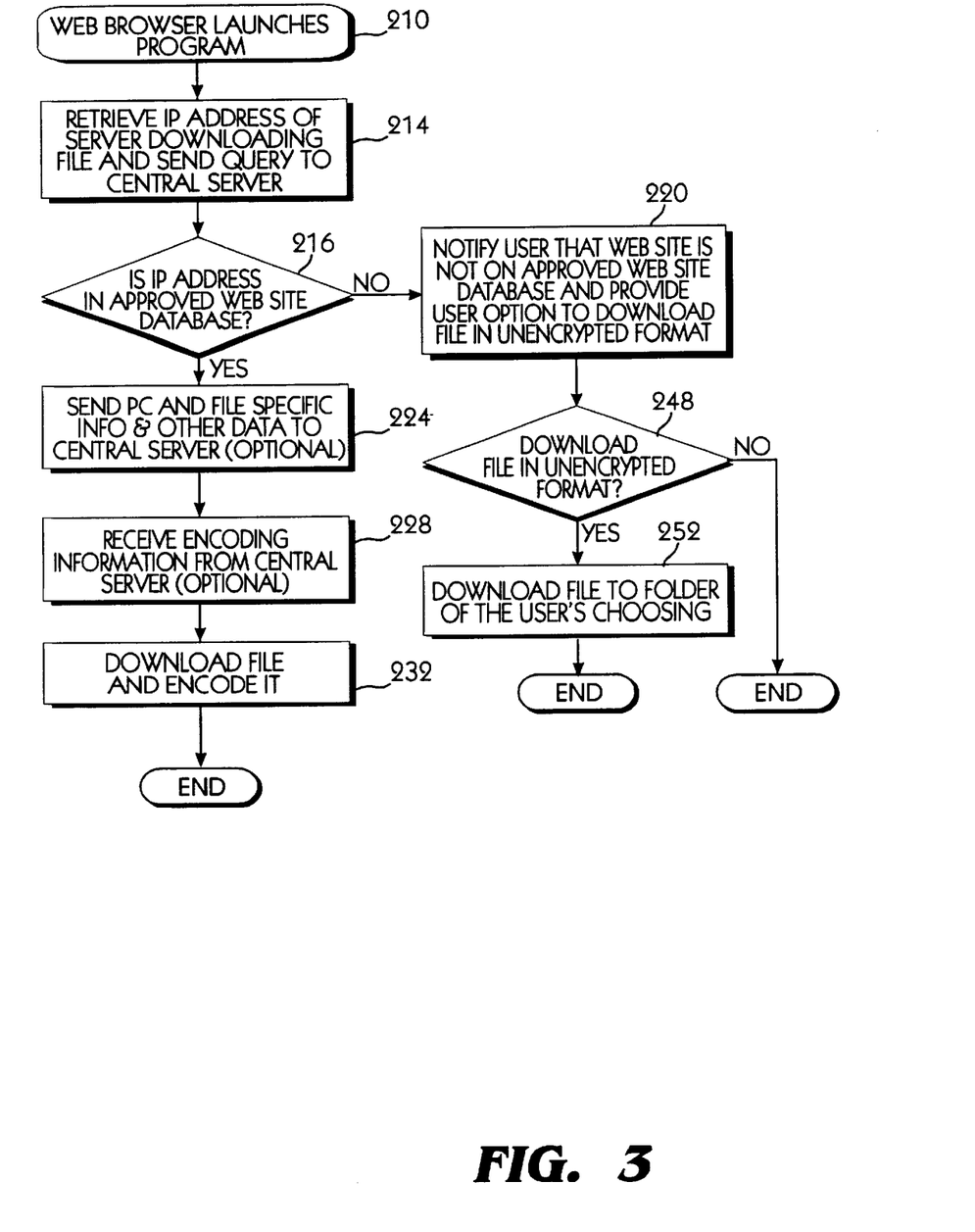
FIG. 3 is a flow chart of a process for encoding files downloaded from a web site on the Approved Web Site Database with the involvement of a Central Server.

FIG. 3 illustrates the steps of the process for downloading a selected file from server 116.

The Approved Web Site MP3 downloading invention requires the existence of a server on the Internet (i.e., a Central Server) that contains an Approved Web Site Database, which is a list of web sites that have been approved as acceptable sources for downloading a file of a certain type to non-PC digital devices, and also to digital storage devices with PC interfaces and PC's loaded with appropriate software which are adherent to the specification illustrated in FIG. 1. These embodiments also support copyright protection for transfer of digital content to non-PC, Internet enabled digital storage devices able to download content from the Internet without the assistance of a PC.

Before a user begins to download files from the Internet onto a digital storage device with a PC interface, the user first needs to load a software program (Software Program) onto the PC. The Software Program can contain its own web browser or can be used in conjunction with another web browser already stored on the PC; if the Software Program is to be used with another web browser, the Software Program can provide a plugin that works with the web browser or can configure the web browser so that the re-configured web browser is the default executable program that is run whenever a user opens a file of the type that the.

Software Program will be protecting (e.g. MP3), as is illustrated in FIG. 2 and is presumed to be the method in use in the description below, although an implementation of this process with a plug-in or proprietary web browser would be done in much the same way.

The file downloading process for an approach involving a central server for each downloaded file is illustrated in the flowchart of FIG. 2. It begins with step 200 when a user is using the web browser on a PC to visit a web site that contains files that the user wishes to download. In step 204 the user clicks on the file that he wishes to download and then, in step 206, the browser prompts the user to declare whether the user wishes to open the file or to save it. In order to be able to download or play the file on his digital storage device, the user must launch the Software Program in step 210, which in this case means that the user must choose the "open file" option. If the user selects the download or "save" option, however, during step 208 the browser downloads the file without first encrypting the file.

Turning now to FIG. 3, when the Software Program is launched, it retrieves the IP address of the server from which the file is to be downloaded during step 214, and it then sends a query to the Central Server to check if the IP address is in an Approved Web Site Database (step 216). If the server from which the file is to be downloaded is in the Database, the Software Program begins downloading the file during steps 224, 228 and 232. Either before, during or after the file is downloaded to the PC's hard drive during step 232, the Central Server may prompt the Software Program to send PC and file specific information, encryption information and other data to the Central Server (this is optional step 224). The Central Server utilizes the information it receives from the Software Program either alone or in combination with other data to send unique encoding information back to the Software Program during step 228, so that the Software Program can use that encoding information to encode the file being downloaded by using an encoding method unique to that PC and to that file being downloaded. Alternatively, the Software Program can encode the file by using encoding information previously downloaded from the Central Server or without receiving any encoding information from the Central Server at all. The Software Program can encrypt the file, or it can use an encoding technique that keeps the file in an open unencrypted format; with the latter approach, the Software Program can add a digital signature, encode a tag or field in the header of the file, or use another encoding method that is not easy to modify or duplicate. In the event the file is kept in an open format, the file can be copied freely by the PC, but a digital storage device can be configured to not play files that are improperly encoded, even if the files are in an open format. The Software Program can begin the process of encoding the file as it is being downloaded, or alternatively, it can wait until the complete file is downloaded and stored in a hidden directory in the PC's hard drive, and then begin the process of encoding that file.

If, during step 216, the prompt establishes that the IP address is not an approved web site listed in the Database, then during step 220 the program notifies the user that the web site is not on the approved web site Database, and provides the user with an option to download the selected file albeit in unencrypted format (step 248). If the user decline the option, the program terminates the process. If, in step 248, the use the accepts the option, the program during step 252 downloads the file to a folder of the user's choice, and then terminates the process.

The user needs to use the Software Program to download that file from a PC to a digital storage device because the digital storage device will only play or display files that have been appropriately encoded by the Software Program. The method by which the digital storage device downloads encoded files from the PC is illustrated, in FIG. 4, by a process that does not require the use of a Central Server.

Figure 4:
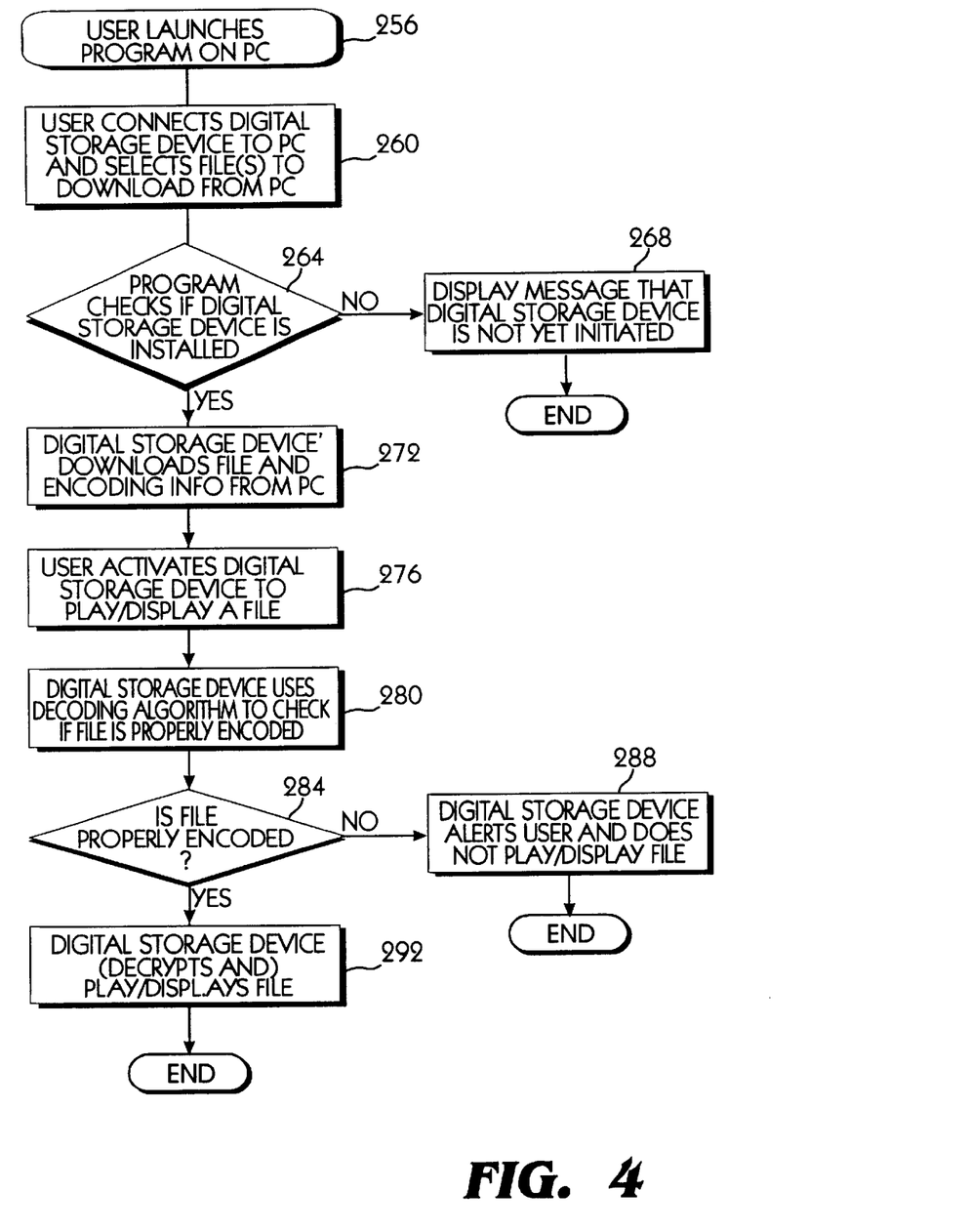
FIG. 4 is a flowchart of a process used by a Digital Storage Device to download and play/display encrypted files downloaded from a personal computer.

The file downloading process begins when a user is using the web browser on his PC to visit a web site that contains files that the user wishes to download. FIG. 4 illustrates the steps by which digital storage device 120 is able to download encrypted files from personal computer 114. In step 256, the user launches the program on personal computer 114. Then, in step 260, the user connects a digital storage device 120 to computer 114, and selects the particular desired file that the user wishes to download from computer 114. During step 264, the Software Program checks to determine whether the digital storage device 120 has been installed. If the determination establishes that device 120 has not been installed, the Program displays a message on screen 122 during step 268, starting that digital storage device 120 has not been yet initiated, and terminates the download algorithm. If the determination establishes that digital storage device 120 has been installed, however, during step 272 digital storage device 120 downloads the selected file and the corresponding encryption information from computer 114.

Subsequently, the user may activate device 120 in order to either play or display the selected file during step 276. Once the user activates device 120 to either play or display the selected file, during step 280, device 120 employs the encryption key in order to check whether the file has been properly encoded. If, during step 284, the determination is made that the selected file has been properly encoded, device 120 then decrypts and either plays or displays the file selected by the user during step 292. Alternatively, however, if during step 284 a determination is made that the file has not been properly encoded, digital storage device 120 alerts the user and neither plays nor displays the selected file, but terminates the algorithm, in step 288.

In order that digital storage device 120 is able to play or display files that have been obtained from sources other than the Internet, the Software Program may be used by the user to encrypt those files as well. For example, in the case where it is determined to be appropriate to copy the contents of a compact disk onto the hard drive, or other memory of a personal computer 114, for later copying onto a digital audio storage device, for example, the Software Program may be used to appropriately encrypt the music tracks from the compact disk so that only that particular personal computer 114 and the digital storage device 120 downloading the contents directly from that specific computer 114 will be able to play music from that specific compact disk. As an added measure of security, the Software Program may require that computer 114 be connected to the Internet and be able to access encryption coding information from the central server 100 so that the Software Program can use the encryption coding information from the central server 100 to encode the selected file and to generate an encryption key.

Various methods can be used to allow for added security. One method is to download the files over a secure server connection. The entire file can be downloaded using a secure server or another option is to begin the downloading process over a secure server and then complete the downloading using a faster insecure server. With the latter approach, the PC software would determine the IP address while connected to the secure server and the secure server would create a manual or automated link to an insecure server to perform the bulk of the file downloading.

An approach that can be used in addition to or instead of the secure server connection implementation is to combine these methods with a digital signature system, where each file is encoded with a digital signature that uniquely identifies the file as being provided by an authorized source and from a specific web site. The PC software then confirms that the file being downloaded is actually being downloaded from the web site that is indicated by the digital signature.

Figure 5:
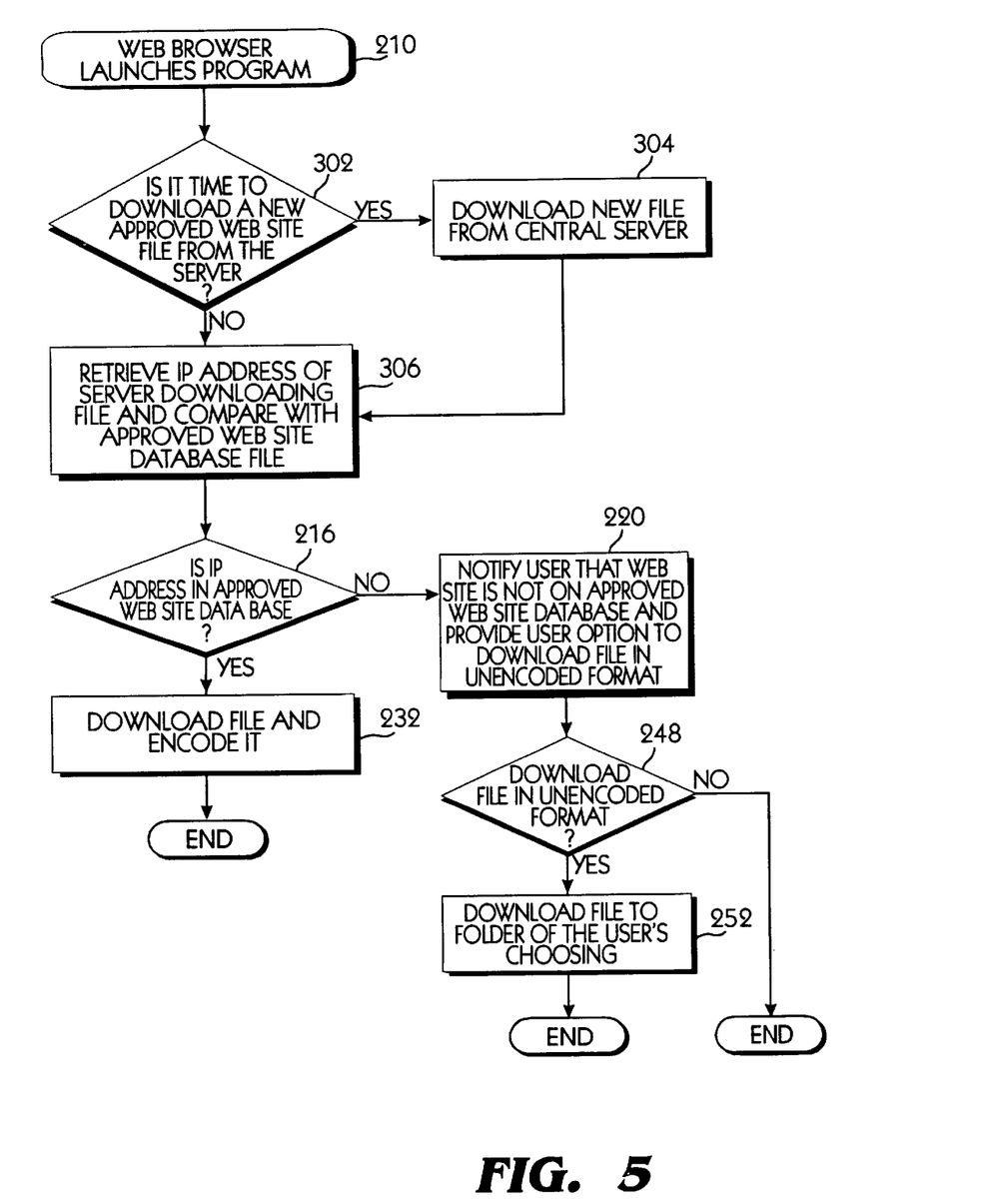
FIG. 5 is a flowchart of a process for encoding music files downloaded from a web site on the Approved Web Site Database without the involvement of a central server.

FIG. 5 illustrates an alternative process for encoding music files that may be downloaded from a web site that is listed on the approved web site Database without requiring the use of a Central Server. After the web browser has launched the Software Program during step 210, a determination is made in step 302 as to whether a preset time has been attained for downloading a new and approved web site from the file server. If the time has been attained, then during step 304 the new file is downloaded from the Central Server. If the determination in step 302 establishes that the time has not been attained, however, step 306 retrieves the IP address of the server downloading the file and compares the IP address with the approved web site Database file. A determination is subsequently made in step 216 as to whether the IP address is listed in the approved web site Database. If the IP address is determined to not be listed, during step 220, the user is notified that the web site is not on the approved web site Database and the user is provided with the option, in step 248, of either downloading the file in unencoded format (step 252) or terminating the program. If the determination establishes in step 216 that the IP address is approved, the file is downloaded and encoded, or alternatively, encoded and then downloaded, during step 232.

In order that a digital storage device be able to play or display files which are obtained from sources other than the Internet, the Software Program needs to be used to encode those files as well. For example, in the case where it is determined to be appropriate to copy a CD onto a PC's hard disk for later copying onto a digital audio storage device, the Software Program can be used to appropriately encode the music tracks from that CD so that only that PC and the digital storage device downloading content directly from that PC are able to play music from that CD. As an added measure of security, the Software Program can require that it be connected to the Internet and be able to access encryption coding information from the Central Server so that the Software Program can use the encryption coding information from the Central Server to encode the file and generate an encryption key.

The method used to implement this process for an Internet enabled digital storage device is similar to that used for a digital storage device with PC interfaces, except that the former does not require a PC to access files from the Internet. As such, the Software Program is loaded on the Internet enabled digital storage device instead of the PC. In addition, when downloading a file of a certain type from the Internet, the enabled digital storage device can be designed so that it will only be able to download files from web sites on the Approved Web Site list, whereas the PC is able to bypass the Software Program to download from any source; however, it is important to note that, even in the case of the PC, a digital device with a PC interface that is compliant with the specifications of this invention is not able to bypass the copyright protection mechanisms built into this invention.

A digital content encryption apparatus designed to restrict the sources from which a digital storage device will play or display digital content may use an Approved Web Site Database which contains a list of the web sites which are determined to be appropriate sources of files of a certain type for digital storage device. A Central Server connected to the Internet on which the Approved Web Site Database is stored performs one or more of the following functions. When prompted by the Software Program located on a PC or Internet enabled digital storage device, the Central Server performs a query search to determine whether a submitted IP address is on the Approved Web Site Database; when it is found that the IP address is on the Approved Web Site Database, it generates encryption key/encoding information that is unique to the file being downloaded and the device to which the file is being downloaded, and transmits it to the Software Program; it transmits a unique encryption key/encoding information to the Software Program when the Software Program requests one for the purpose of encoding digital content that is being transferred from a media storage peripheral device to the device's own digital storage memory. Alternatively, the Central Server can simply allow for the download of a file containing the Approved Web Site Database as well as encoding information.

A Software Program located on a PC performs one or more of the following functions: it identifies the IP address from which a file is being downloaded; it sends a query to the Central Server to determine whether an IP address is on the Approved Web Site Database; it retrieves encoding information from the Central Server when the IP address is on the Approved Web Site Database; it encodes the downloaded file on its own or using the encryption key provided by the Central Server; it initializes a digital storage device so that the digital storage device is able to download and play encrypted files downloaded from the PC; it encodes the downloaded file if the IP address is on the Approved Web Site Database; and it initializes a digital storage device so that the digital storage device is able to download and play/display encrypted files downloaded from the PC.

A digital storage device with a PC interface performs one or more of the following functions: it connects to a PC so that it can be initialized by the Software Program; it allows the Software Program to retrieve information of files that it stores; it allows a user to download files to it through the user interface of the PC Software Program; it retrieves encryption key and/or encoding information from Software Program for files that it downloads; it only plays/displays files that are appropriately encoded; it does not play/display files that are sent to it in unencoded format; and it does not provide other devices with access to its encoding information.

Each file may be encoded with a digital signature that uniquely identifies it as being provided by a legal source and from a specific web site; the PC software confirms, using the Approved Web Site Downloading approach, that the file being downloaded is actually being downloaded from the web site that is indicated by the digital signature.

The file downloading process begins over a secure server connection, during which time the PC software determines the IP address of the server from which the file is to be downloaded; and the secure sewer creates a manual or automated link to an insecure server to perform the rest of the file downloading.

The foregoing paragraphs describe a workable solution that is relatively efficient and foolproof when incorporated into processes and apparatus during the practice of the principles of the present invention. It remedies the problem of protecting copyrightable material from unlawful use, reproduction and distribution by ensuring that a digital storage device will only be able to download or play those files that were obtained from sources deemed, either by the manufacturer of the device or by an overseeing organization, to be acceptable. This ensures that these processes and digital storage devices do not download, play or display files that were obtained over the Internet from web sites that have not been pre-approved by either the manufacturer of the device or by an overseeing organization.

What is claimed is:

1. A digital content encryption apparatus, comprising:
   a central server maintaining an Approved Web Site Database comprising a list of web sites determined to be authorized sources of files for digital storage devices manufactured to use a key to decrypt and play the files, said central server being connectable to an Internet, and wherein:
   when prompted by a user via one of a computer and an Internet enabled digital storage device, said central server determines whether a submitted IP address supplied by the user is on said Approved Web Site Database;
   when a determination is made that said submitted IP address is on the Approved Web Site Database, said central server generates an encryption key and encryption information that is unique to a selected file requested by the user to be downloaded and to any device to which it is being downloaded, and transmits the encryption key and the encryption information to a Software Program; and
   said central server transmits unique encryption key/encoding information to the Software Program when the Software Program requests the unique encryption key/encoding information for the purpose of encoding digital content that is being copied from a media storage peripheral device onto a digital storage memory;
   a personal computer comprising a memory storing the Software Program, said Software Program executing the steps of:
   identifying an IP address from which a file is being downloaded;
   sending a query to said central server to determine whether the identified IP address is on the Approved Web Site Database;
   retrieving the encryption key from said central server when the identified IP address is on the Approved Web Site Database;
   encrypting the downloaded file;
   encrypting digital content being copied from a PC peripheral onto a memory of said personal computer; and
   initializing a digital storage device to download and play/display encrypted files downloaded from said personal computer; and
   a digital storage device having a PC interface, and connectable to said personal computer, for accommodating retrieval by said Software Program of information stored by said digital storage device, for storing download files received through a user interface of the Software Program, for retrieving encryption keys from said Software Program for downloaded files, for playing and displaying only files that are encrypted in conformity with said encryption key/encoding information, and for refusing to play and display files in an unencrypted format.

2. The apparatus of claim 1, wherein said Software Program encrypts the downloaded file on its own.

3. The apparatus of claim 2, wherein said Software Program requests the unique encryption key/encoding information from said central server for the purpose of encrypting the digital content being copied from the PC peripheral.

4. The apparatus of claim 3, wherein said Software Program also generates own encryption key for the purpose of encrypting the digital content being copied from the PC peripheral.

5. The apparatus of claim 2, wherein said Software Program generates own encryption key for the purpose of encrypting the digital content being copied from the PC peripheral.

6. The apparatus of claim 1, wherein said Software Program encrypts the downloaded file using the encryption key provided by said central server.

7. The apparatus of claim 6, wherein said Software Program requests the unique encryption key/encoding information from said central server for the purpose of encrypting the digital content being copied from the PC peripheral.

8. The apparatus of claim 7, wherein said Software Program also generates own encryption key for the purpose of encrypting the digital content being copied from the PC peripheral.

9. The apparatus of claim 6, wherein said Software Program generates own encryption key for the purpose of encrypting the digital content being copied from the PC peripheral.

10. The apparatus of claim 1, wherein said Software Program requests the unique encryption key/encoding information from said central server for the purpose of encrypting the digital content being copied from the PC peripheral.

11. The apparatus of claim 10, wherein said Software Program also generates own encryption key for the purpose of encrypting the digital content being copied from the PC peripheral.

12. The apparatus of claim 1, wherein said Software Program generates own encryption key for the purpose of encrypting the digital content being copied from the PC peripheral.

13. The apparatus of claim 1, further comprising an additional server holding files for downloading, said personal computer communicating with said additional server via the Internet.

14. A method of ensuring that downloading over an Internet of a file designated by a user is an authorized downloading, comprising the steps of:
   (a) providing a central server with an Approved Web Site Database comprising a list of servers authorized to be source of files for downloading over the Internet;
   (b) receiving at said central server from the user an IP address of an additional server providing the file designated by the user as downloadable data;
   (c) determining whether the IP address of the additional server is on the Approved Web Site Database;
   (d) when it is determined that the IP address of the additional server is on the Approved Web Site Database, notifying the user that downloading from the additional server is authorized; and
   (e) downloading the file designated by the user from the additional server;
   wherein step (d) further comprises transmitting at least one of an encryption key and encryption information unique to the file designated by the user from said central server to a personal computer of the user.

15. The method of claim 14, wherein step (b) further comprises receiving at said central server from the user at least one of information specific to a personal computer of the user and information specific to the file designated by the user.

16. The method of claim 15, wherein step (e) further comprises encoding the file designated by the user once it is downloaded from the additional server.

17. The method of claim 16, wherein the file designated by the user is encoded by the personal computer of the user using an encryption key stored in the personal computer of the user.

18. The method of claim 16, wherein the file designated by the user is encoded by the personal computer of the user using the encryption key transmitted from said central server to the personal computer of the user.

19. The method of claim 14, wherein step (e) further comprises encoding the file designated by the user once it is downloaded from the additional server.

20. The method of claim 19, wherein the file designated by the user is encoded by the personal computer of the user using an encryption key stored in a personal computer of the user.

21. The method of claim 19, wherein the file designated by the user is encoded by the personal computer of the user using an encryption key transmitted from said central server to the personal computer of the user.

22. A method of ensuring that downloading over an Internet of a file designated by a user is an authorized downloading, comprising the steps of:
   (a) providing a central server with an Approved Web Site Database comprising a list of servers authorized to be source of files for downloading over the Internet;
   (b) receiving at said central server from the user an IP address of an additional server providing the file designated by the user as downloadable data;
   (c) determining whether the IP address of the additional server is on the Approved Web Site Database;
   (d) when it is determined that the IP address of the additional server is on the Approved Web Site Database, notifying the user that downloading from the additional server is authorized; and
   (e) downloading the file designated by the user from the additional server;
   said method further comprising the steps, after step (d), of:
      receiving at said central server a request from a personal computer of the user for at least one of a unique encoding key and unique encoding information;
      generating at said central server at least one of a unique encryption key and unique encryption information; and
      transmitting said at least one of the unique encryption key and the unique encryption information from said central server to the personal computer of the user.

23. The method of claim 22, wherein step (e) further comprises encoding the file designated by the user once it is downloaded from the additional server.

24. The method of claim 23, wherein the file designated by the user is encoded by the personal computer of the user using an encryption key stored in the personal computer of the user.

25. The method of claim 23, wherein the file designated by the user is encoded by the personal computer of the user using the encryption key transmitted from said central server to the personal computer of the user.

26. The method of claim 22, wherein said personal computer of the user uses said at least one of the unique encryption key and the unique encryption information to encode digital content that is being copied from a peripheral of the personal computer of the user onto a digital storage device of the user.

27. An apparatus for ensuring that downloading over an Internet of at least one file designated by a user is an authorized downloading, comprising
   a central server containing an Approved Web Site Database comprising a list of servers authorized to be sources of files for downloading over the Internet;
   an additional server providing downloadable data; and
   a personal computer of the user for communicating with said central server and with said additional server over the Internet;
   wherein said central server receives from the user an IP address of the additional server, and determines whether the IP address of the additional server is on the Approved Web Site Database; and
   wherein, when it is determined that the IP address of the additional server is on the Approved Web Site Database, said central server notifies the personal computer of the user that downloading from the additional server is authorized;
   wherein said central server transmits to the personal computer of the user at least one of an encryption key and encryption information unique to said at least one file designated by the user.

28. The apparatus of claim 27, wherein said central server also receives from the user identification of said at least one file designated by the user for downloading from the additional server.

29. The apparatus of claim 27, wherein said central server also receives from the user at least one of information specific to a personal computer of the user and information specific to said at least one file designated by the user.

30. The apparatus of claim 29, wherein the personal computer of the user encodes said at least one file designated by the user once it is downloaded from the additional server.

31. The apparatus of claim 30, wherein said at least one file designated by the user is encoded by the personal computer of the user using an encryption key stored in the personal computer of the user.

32. The apparatus of claim 30, wherein said at least one file designated by the user is encoded by the personal computer of the user using the encryption key transmitted by the central server to the personal computer of the user.

33. The apparatus of claim 27, wherein the personal computer of the user encodes said at least one file designated by the user once it is downloaded from the additional server.

34. The apparatus of claim 33, wherein said at least one file designated by the user is encoded by the personal computer of the user using an encryption key stored in the personal computer of the user.

35. The apparatus of claim 33, wherein said at least one file designated by the user is encoded by the personal computer of the user using an encryption key transmitted by the central server to the personal computer of the user.

36. The apparatus of claim 33, wherein said at least one file designated by the user is encoded by the personal computer of the user using an encryption key stored in the personal computer of the user once said at least one file designated by the user is downloaded from said additional server.

37. The apparatus of claim 33, wherein said at least one file designated by the user is encoded by the personal computer of the user using an encryption key transmitted to the personal computer of the user by the central server once said at least one file designated by the user is downloaded from said additional server.

38. A memory medium containing software provided for the purpose of ensuring that downloading over an Internet of a file designated by a user is an authorized downloading, said software carrying out the steps of:

(a) transmitting, to a central server having an Approved Web Site Database, an IP address of an additional server providing the file designated by the user;

(b) when the IP address of the additional server is determined by the central server to be on the Approved Web Site Database, receiving from the central server notification that downloading from the additional server is authorized; and (c) downloading the file designated by the user from the additional server;

wherein said central server transmits at least one of an encryption key and encryption information unique to the file designated by the user to the personal computer of the user.

39. The memory medium of claim 38, wherein said central server receives from the software at least one of information specific to a personal computer of the user and information specific to the file designated by the user.

40. The memory medium of claim 39, wherein said software encodes the file designated by the user once it is downloaded from the additional server.

41. The memory medium of claim 40, wherein the file designated by the user is encoded by the software using an encryption key stored in the personal computer of the user.

42. The memory medium of claim 40, wherein the file designated by the user is encoded by the software using the encryption key transmitted from said central server to the personal computer of the user.

43. The memory medium of claim 38, wherein said software encodes the file designated by the user once it is downloaded from the additional server.

44. The memory medium of claim 43, wherein said software encodes the file designated by the user using an encryption key stored in a personal computer of the user.

45. The memory medium of claim 43, wherein software encodes the file designated by the user using an encryption key transmitted from said central server to the personal computer of the user.

46. A memory medium containing software provided for the purpose of ensuring that downloading over an Internet of a file designated by a user is an authorized downloading, said software carrying out the steps of:

(a) transmitting, to a central server having an Approved Web Site Database, an IP address of an additional server providing the file designated by the user;

(b) when the IP address of the additional server is determined by the central server to be on the Approved Web Site Database, receiving from the central server notification that downloading from the additional server is authorized; and (c) downloading the file designated by the user from the additional server;

wherein said software:

transmits to said central server a request for at least one of a unique encoding key and unique encoding information; and receives from said central server at least one of a unique encryption key and unique encryption information.

47. The memory medium of claim 46, wherein said software encodes the file designated by the user once it is downloaded from the additional server.

48. The memory medium of claim 47, wherein the file designated by the user is encoded by the software using an encryption key stored in the personal computer of the user.

49. The memory medium of claim 47, wherein the file designated by the user is encoded by the software using the encryption key transmitted from said central server to the personal computer of the user.

50. The memory medium of claim 46, wherein said software uses said at least one of the unique encryption key and the unique encryption information to encode digital content that is being copied from a peripheral of a personal computer of the user onto a digital storage device of the user.

* * * * *